United States Patent
Fujiwara

(10) Patent No.: US 9,128,112 B2
(45) Date of Patent: Sep. 8, 2015

(54) DETERMINATION DEVICE, ELECTRICAL DEVICE, AND METHOD OF DETERMINING MOVING STATE

(71) Applicant: LAPIS SEMICONDUCTOR CO., LTD., Kanagawa (JP)

(72) Inventor: Kazunori Fujiwara, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 162 days.

(21) Appl. No.: 14/037,502

(22) Filed: Sep. 26, 2013

(65) Prior Publication Data

US 2014/0082952 A1    Mar. 27, 2014

(30) Foreign Application Priority Data

Sep. 26, 2012  (JP) ................. 2012-213090

(51) Int. Cl.
*G01P 13/00*  (2006.01)
(52) U.S. Cl.
CPC ..................... *G01P 13/00* (2013.01)
(58) Field of Classification Search
CPC .......... G01C 21/00; G01P 13/00; G01P 15/00
USPC ......... 33/316, 317 R, 317 D, 318, 355 R, 356
See application file for complete search history.

(56) References Cited

U.S. PATENT DOCUMENTS

| 5,327,348 | A  | * | 7/1994  | Kato ............................. 33/356 |
| 2007/0119061 | A1 | * | 5/2007  | Lee et al. ...................... 33/356 |
| 2009/0248352 | A1 | * | 10/2009 | Hirobe et al. ............... 33/355 R |
| 2010/0177037 | A1 | * | 7/2010  | Kim et al. ................... 33/355 R |
| 2010/0307016 | A1 | * | 12/2010 | Mayor et al. .................. 33/356 |
| 2010/0312510 | A1 | * | 12/2010 | Piemonte et al. ............. 33/303 |

FOREIGN PATENT DOCUMENTS

| JP | 2011-139301 A | 7/2011  |
| JP | 2011-257374 A | 12/2011 |

* cited by examiner

*Primary Examiner* — G. Bradley Bennett
(74) *Attorney, Agent, or Firm* — Kubotera & Associates, LLC

(57) ABSTRACT

A determination device includes a geomagnetism value obtaining unit for obtaining a geomagnetism value detected with a geomagnetism sensor; and a geomagnetism value determining unit for determining whether a user having the geomagnetism sensor is in a moving state in an automobile or on a train according to a magnitude of a change in the geomagnetism value obtained with the geomagnetism value obtaining unit.

9 Claims, 10 Drawing Sheets

DETERMINATION DEVICE, ELECTRICAL DEVICE, AND METHOD OF DETERMINING MOVING STATE

BACKGROUND OF THE INVENTION AND RELATED ART STATEMENT

The present invention relates to a determination device, an electrical device having the determination device, and a method of determining a moving state of a user.

Patent References 1 and 2 have disclosed a conventional determination device for determining a moving state of a user. In the conventional determination device, an acceleration sensor is disposed in a smartphone and the like for detecting a vibration, so that the conventional determination device determines the moving state of the user such as a moving state on foot, a moving state on a bicycle, a moving state in a vehicle other than a bicycle, and the like. Accordingly, it is possible to obtain a dairy moving pattern of the user.

Patent Reference 1: Japanese Patent Publication No. 2011-139301

Patent Reference 2: Japanese Patent Publication No. 2011-257374

However, the vibration to be detected with the acceleration sensor tends to be very similar between when the user is on a train and an express train (referred to as a train), and when the user is in an automobile (including a bus and a motorcycle). Accordingly, with the conventional determination device, it is difficult to determine whether a vehicle other than a bicycle is a train or an automobile.

In the conventional determination device disclosed in Patent Reference 2, there has been proposed a method of determining a vehicle through estimating a moving direction of the user according to an output of the acceleration sensor and an output of a geomagnetism sensor. However, the method tends to be very complicated. Further, it is necessary to calibrate an offset caused by magnetization of the geomagnetism sensor before the determination.

In view of the problems described above, an object of the present invention is to provide a determination device, an electrical device having the determination device, and a method of determining a moving state capable of solving the problems of the conventional determination device. In the determination device, the electrical device, and the method of the present invention, it is possible to easily determine the moving state of the user whether in an automobile or on a train.

Further objects and advantages of the invention will be apparent from the following description of the invention.

SUMMARY OF THE INVENTION

In order to attain the objects described above, according to a first aspect of the present invention, a determination device includes a geomagnetism value obtaining unit for obtaining a geomagnetism value detected with a geomagnetism sensor; and a geomagnetism value determining unit for determining whether a user having the geomagnetism sensor is in a moving state in an automobile or on a train according to a magnitude of a change in the geomagnetism value obtained with the geomagnetism value obtaining unit.

According to a second aspect of the present invention, an electrical device includes the geomagnetism sensor for detecting the geomagnetism value and the determination device described in the first aspect.

According to a third aspect of the present invention, an electrical device includes the geomagnetism sensor for detecting the geomagnetism value; the determination device described in the first aspect; and a processing device. The processing device includes a display unit; a orientation measurement unit for measuring an orientation using the geomagnetism value obtained with the geomagnetism sensor so that the orientation is displayed on the display unit; and a processing unit for performing a process of stopping the orientation measurement unit to measure the orientation, or notifying that there is a possibility of an error in the orientation to be displayed on the display unit.

According to a fourth aspect of the present invention, a method of determining a moving state of a user includes the steps of obtaining a geomagnetism value detected with a geomagnetism sensor; and determining whether the user having the geomagnetism sensor is in the moving state in an automobile or on a train according to a magnitude of a change in the geomagnetism value thus obtained.

According to a fifth aspect of the present invention, a non-transitory computer readable medium that stores a program that causes a computer to execute the steps of obtaining a geomagnetism value detected with a geomagnetism sensor; and determining whether the user having the geomagnetism sensor is in the moving state in an automobile or on a train according to a magnitude of a change in the geomagnetism value thus obtained. A non-transitory computer readable medium includes a hard drive, a compact disc, a flash memory, a volatile memory, and the like, but does not include a transitory signal per se.

As described above, according to the present invention, as opposed to the conventional techniques, it is possible to easily determine the moving state of the user whether in an automobile or on a train.

DETAILED DESCRIPTION OF PREFERRED EMBODIMENTS

Hereunder, preferred embodiments of the present invention will be explained with reference to the accompanying drawings.

First Embodiment

Figure 1:
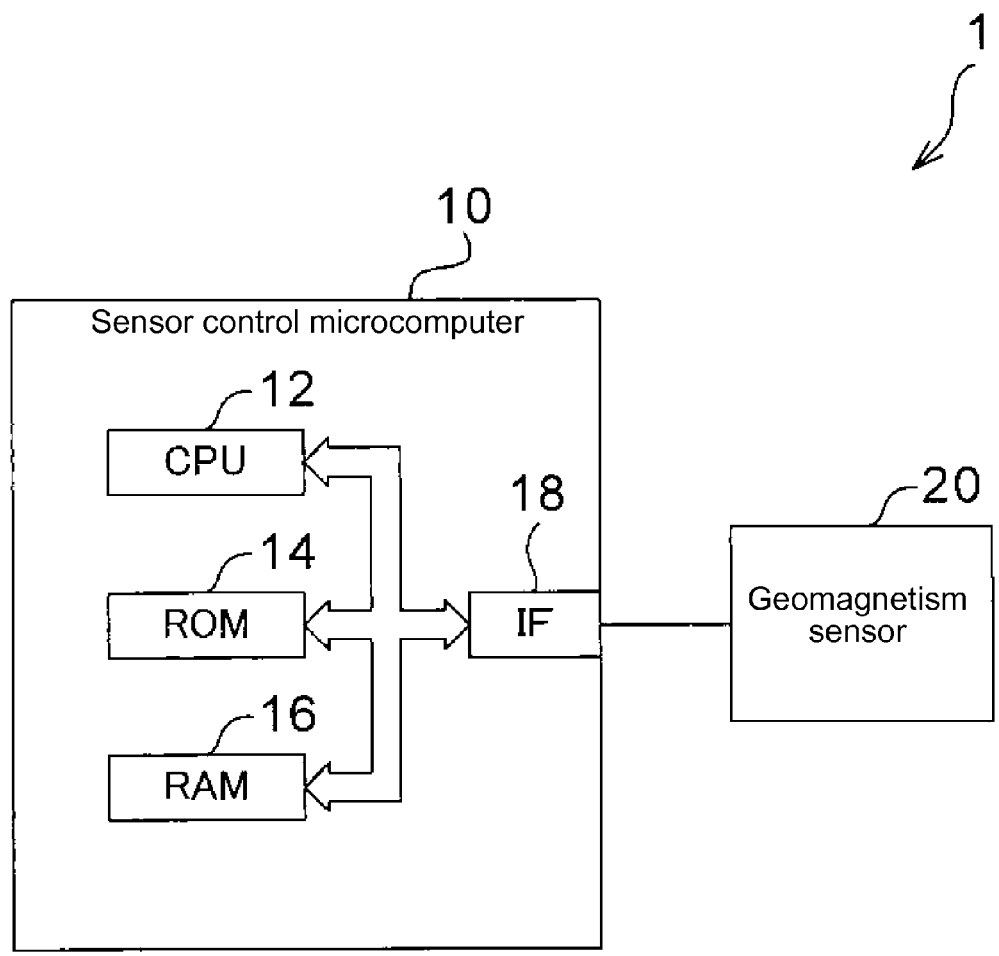
FIG. 1 is a block diagram showing a configuration of an electrical device according to a first embodiment of the present invention.

A first embodiment of the present invention will be explained. FIG. 1 is a block diagram showing a configuration of an electrical device 1 according to the first embodiment of the present invention.

As shown in FIG. 1, the electrical device 1 includes a sensor control microcomputer 10 as an example of a determination device; and a geomagnetism sensor 20. The sensor control microcomputer 10 includes a CPU (Central Processing Unit) 12; an ROM (Read Only Memory) 14; an RAM (Random Access Memory) 16; and an IF (Interface) 18. The geomagnetism sensor 20 is connected to the IF 18. The sensor control microcomputer 10 is configured to control the geomagnetism sensor 20 through the IF 18. Further, the sensor control microcomputer 10 is configured to obtain a geomagnetism value (described later) detected with the geomagnetism sensor 20, so that the sensor control microcomputer 10 uses the geomagnetism value to determine a moving state of a user.

In the first embodiment, the CPU 12 executes a program stored in the ROM 14 to realize predetermined functions (a control function of the geomagnetism sensor 20, a determination function, and the like). The RAM 16 is used as a work memory and the like.

In the first embodiment, the geomagnetism sensor 20 is connected to the IF 18. The geomagnetism sensor 20 may be a sensor for detecting the geomagnetism value in one specific axis, or a sensor for detecting the geomagnetism value in each of a plurality of axes (two axes or three axes). When the geomagnetism sensor 20 is the sensor for detecting the geomagnetism value in one specific axis, the geomagnetism sensor 20 outputs geomagnetism data representing the geomagnetism value in the axis as a detection result. When the geomagnetism sensor 20 is the sensor for detecting the geomagnetism value in a plurality of axes, the geomagnetism sensor 20 outputs geomagnetism data representing the geomagnetism value in each of the axes as a detection result. Alternatively, the geomagnetism sensor 20 may calculate a composite value by combining the geomagnetism value in each of the axes, and output geomagnetism data representing the composite value as a detection result.

In the first embodiment, the electrical device 1 determines the moving state of the user in a state that the user is carrying the electrical device 1. In particular, the electrical device 1 determines the moving state of the user whether in an automobile or on a train in a state that the user is carrying the geomagnetism sensor 20 (the electrical device 1 including the geomagnetism sensor 20). In the following description, the determination process is referred to as an automobile and train determination process. The automobile to be detected includes a motorcycle, a bus, and the like in addition to an ordinary automobile. Further, the train is a train compartment provided with a motor (an electric motor), and also includes an express train and the like.

Figure 2:
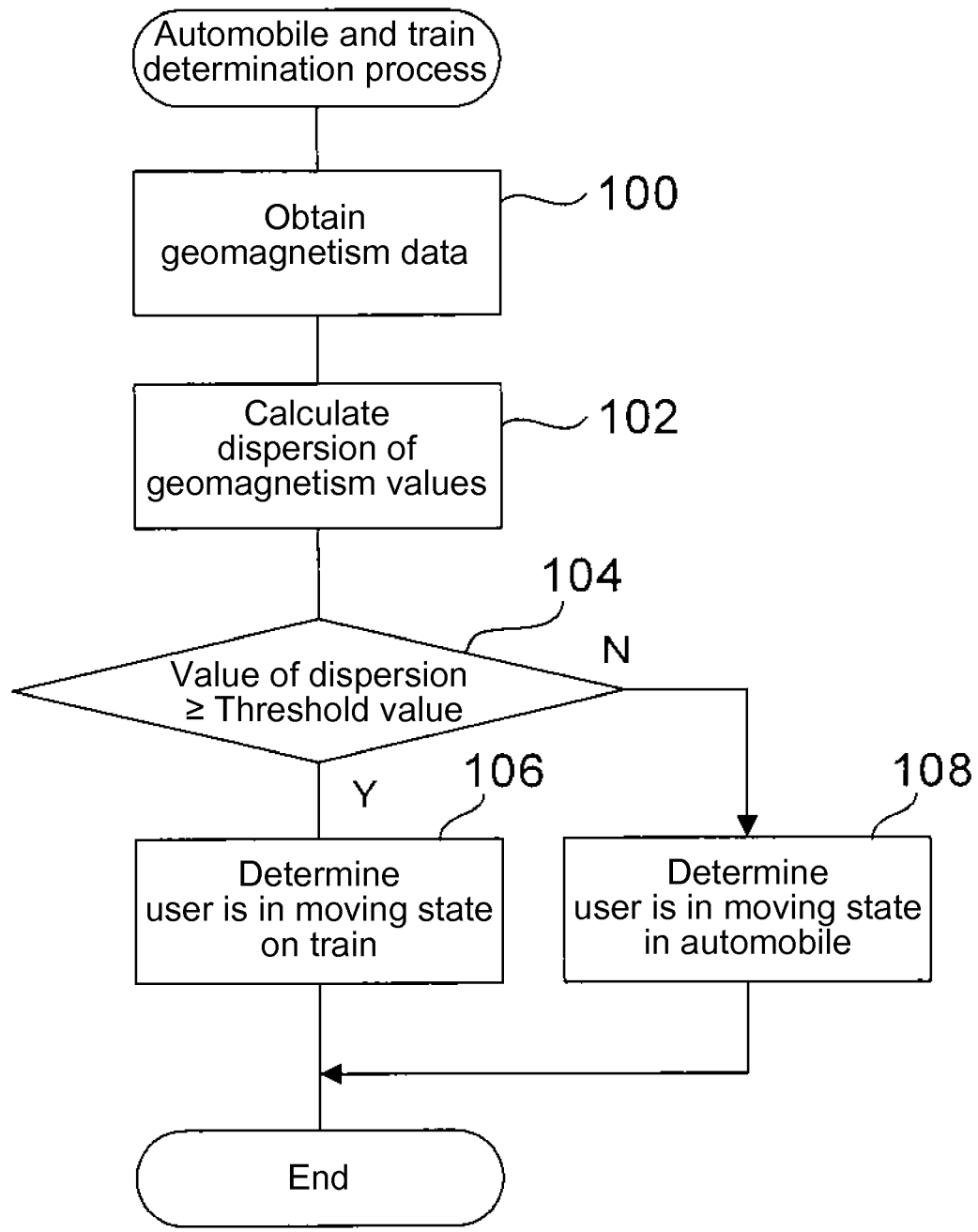
FIG. 2 is a flow chart showing an operation of a determination device of the electrical device according to the first embodiment of the present invention.

The automobile and train determination process preformed with the sensor control microcomputer 10 will be explained next in more detail. FIG. 2 is a flow chart showing an operation of the determination device 10 of the electrical device 1 according to the first embodiment of the present invention. More specifically, the CPU 12 of the sensor control microcomputer 10 executes the program to perform the automobile and train determination process represented with the flow chart shown in FIG. 2.

In step 100, the sensor control microcomputer 10 obtains the geomagnetism data from the geomagnetism sensor 20. In this case, the sensor control microcomputer 10 obtains the geomagnetism data in a predetermined number. For example, when the geomagnetism sensor 20 is the sensor that detects the geomagnetism value every a period of time t, and the predetermined number N (N is a positive integer), the sensor control microcomputer 10 sequentially obtains the geomagnetism data in the number of N that are detected every a period of time t.

In step 102, the sensor control microcomputer 10 calculates a dispersion of the geomagnetism values according to the geomagnetism values represented with the geomagnetism data thus obtained. The dispersion of the geomagnetism values is calculated with the following equation (1):

$$\text{Dispersion} = \Sigma(\text{geomagnetism value} - \text{average of geomagnetism values}) \times 2/\text{Number of geomagnetism data} \quad (1)$$

In the equation (1) described above, the number of the geomagnetism data corresponds to the predetermined number N.

In the first embodiment, when the geomagnetism sensor 20 detects the geomagnetism value in one axis, the dispersion of the geomagnetism values is calculated with the equation (1). When the geomagnetism sensor 20 detects the geomagnetism values in a plurality of axes, the dispersion of the geomagnetism values is calculated with the equation (1) using the composite value combined of the geomagnetism value in each of the axes. Alternatively, the dispersion of the geomagnetism value in each of the axes may be calculated separately, so that the dispersion having the largest value among the dispersion in each of the axes is utilized as the calculation result in step 102.

Further, when the dispersion of the geomagnetism values is calculated with the equation (1) using the composite value, the sensor control microcomputer 10 may obtain the geomagnetism data and calculate the composite value combined of the geomagnetism values represented with the geomagnetism data to calculate the dispersion when the geomagnetism sensor 20 outputs the geomagnetism data presenting the geomagnetism value in each of the axes. Further, when the geomagnetism sensor 20 outputs the geomagnetism data representing the composite value, the sensor control microcomputer 10 obtains the geomagnetism data and calculates the dispersion using the composite value represented by the geomagnetism data.

In step 104, the sensor control microcomputer 10 compares the value of the dispersion thus calculated with a threshold value determined in advance. In step 106, when the sensor control microcomputer 10 determines that the dispersion is equal to or greater than the threshold value in step 104, the sensor control microcomputer 10 determines that the user is in the moving state on the train. In step 108, when the sensor control microcomputer 10 determines that the dispersion is smaller than the threshold value in step 104, the sensor control microcomputer 10 determines that the user is in the moving state in the automobile.

Figure 3:
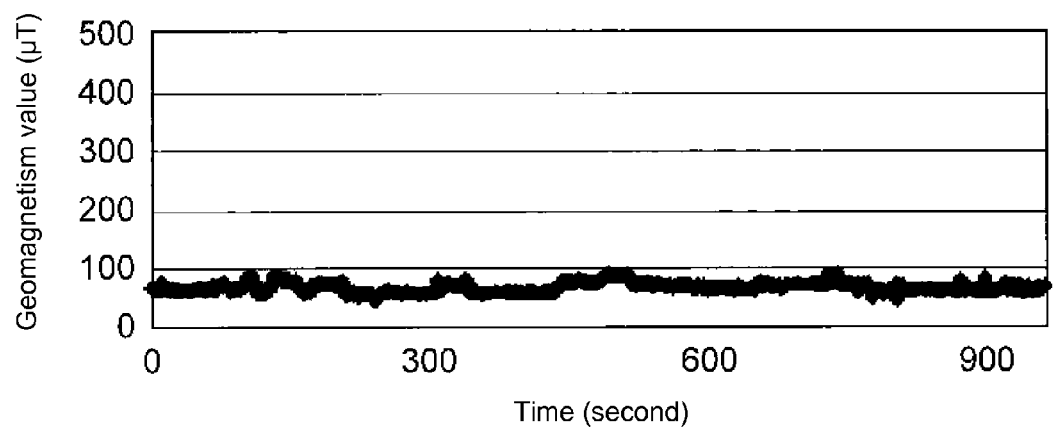
FIG. 3 is a graph showing an example of a wave pattern of a geomagnetism value detected with the determination device when a user is moving in an automobile according to the first embodiment of the present invention.
Figure 4:
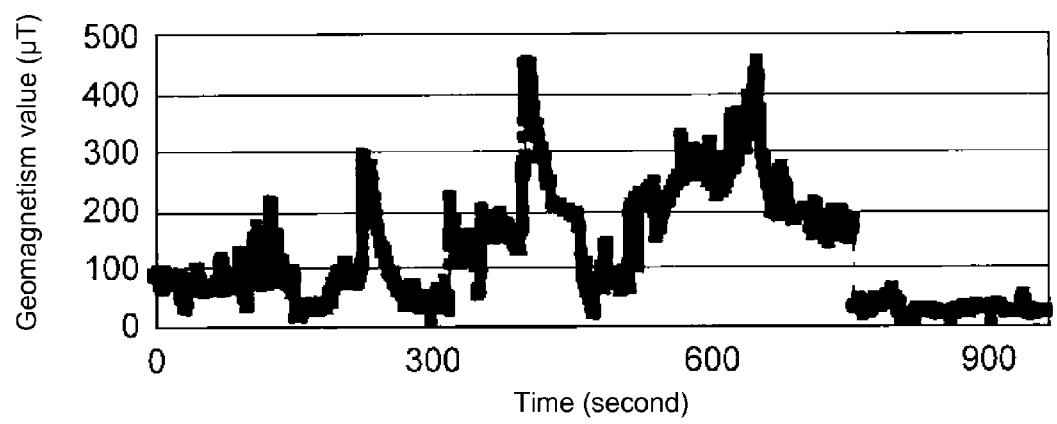
FIG. 4 is a graph showing an example of the wave pattern of the geomagnetism value detected with the determination device when the user is moving on a train according to the first embodiment of the present invention.

The automobile and train determination process will be explained next in more detail. When the user is moving on the train (especially, when the train is accelerating or decelerating), the geomagnetism value tends to be disturbed due to an electric motor, an electric cable, and the like. In the first embodiment, it is determined whether the user is in the moving state in the automobile or on the train utilizing the disturbance of the geomagnetism value, FIG. 3 is a graph showing an example of a wave pattern of the geomagnetism value detected with the determination device 1 when the user is moving in the automobile according to the first embodiment of the present invention. FIG. 4 is a graph showing an example of the wave pattern of the geomagnetism value detected with the determination device 1 when the user is moving on the train according to the first embodiment of the present invention. It should be noted that the wave patterns shown in FIGS. 3 and 4 are composite wave patterns combined of the geomagnetism value in each of the three axes.

As shown in FIGS. 3 and 4, as compared with the case that the user is moving in the automobile, when the user is moving on the train, the geomagnetism value changes to a greater extent. It is considered that the difference is attributed to the electric motor and the electric cable mounted on the train.

In the first embodiment, the dispersion of the geomagnetism value is calculated as a magnitude of the change in the geomagnetism value, so that the determination is made according to the dispersion. It should be noted that the magnitude of the change in the geomagnetism value is not limited to the dispersion of the geomagnetism value. For example, instead of the dispersion, the standard deviation may be used for the determination. When the standard deviation is used for the determination, a threshold value may be defined in advance for the standard deviation. Accordingly, when the standard deviation is equal to or greater than the threshold value, it is possible to determine that the user is in the moving stat on the train. Further, when the standard deviation is smaller than the threshold value, it is possible to determine that the user is in the moving stat in the automobile.

Further, as the magnitude of the change in the geomagnetism value, a difference between the maximum value and the minimum value of the geomagnetism value thus obtained may be used for the determination. Similarly, when the difference is used for the determination, a threshold value may be defined in advance for the difference. Accordingly, when the difference is equal to or greater than the threshold value, it is possible to determine that the user is in the moving stat on the train. Further, when the difference is smaller than the threshold value, it is possible to determine that the user is in the moving stat in the automobile.

Further, as the magnitude of the change in the geomagnetism value, the maximum value or the minimum value of the geomagnetism value thus obtained may be used for the determination. More specifically, when the geomagnetism value is the maximum value (or the minimum value) not possible in a natural magnetic field, it is possible to determine that the user is in the moving stat on the train. Similarly, when the minimum value is used for the determination, a threshold value may be defined in advance for the maximum value. Accordingly, when the maximum value is equal to or greater than the threshold value, it is possible to determine that the user is in the moving stat on the train. Further, when the maximum value is smaller than the threshold value, it is possible to determine that the user is in the moving stat in the automobile. Alternatively, when the minimum value is used for the determination, a threshold value may be defined in advance for the minimum value. Accordingly, when the minimum value is equal to or smaller than the threshold value, it is possible to determine that the user is in the moving stat on the train. Further, when the minimum value is greater than the threshold value, it is possible to determine that the user is in the moving stat in the automobile.

In the first embodiment, it may be configured such that, when a difference between the maximum value of the geomagnetism value and an average value of the geomagnetism value is equal to or greater than a threshold value, it is possible to determine that the user is in the moving stat on the train. Further, when the difference between the maximum value of the geomagnetism value and the average value of the geomagnetism value is smaller than a threshold value, it is possible to determine that the user is in the moving stat in the automobile.

In the first embodiment, it may be configured such that, when the difference between the maximum value of the geomagnetism value and the average value of the geomagnetism value is equal to or greater than the threshold value, and a difference between the minimum value of the geomagnetism value and the average value of the geomagnetism value is equal to or greater than a threshold value, it is possible to determine that the user is in the moving stat on the train. Further, when the difference between the maximum value of the geomagnetism value and the average value of the geomagnetism value is smaller than the threshold value, and the difference between the minimum value of the geomagnetism value and the average value of the geomagnetism value is smaller than a threshold value, it is possible to determine that the user is in the moving stat in the automobile.

Further, in the first embodiment, it may be configured such that a combination of the dispersion, the standard deviation, the difference between the maximum value and the minimum value, the maximum value, and the minimum value of the geomagnetism value may be used for the determination. More specifically, even when it is determined that the user is not in the moving stat on the train using one index, when it is determined that the user is in the moving stat on the train using another index, it may be eventually determined the user is in the moving stat on the train. Alternatively, even when it is determined that the user is in the moving stat on the train using one index, when it is determined that the user is not in the moving stat on the train using another index, it may be eventually determined the user is in the moving stat in the automobile.

Further, in the first embodiment, it may be configured such that the user can select which index is used for the determination. Further, the determination results using a plurality of indexes are stored, so that the user can confirm the determination results and select one index with the highest accuracy.

As described above, in the first embodiment, it is possible to easily determine whether the user is in the moving state on the train or in the automobile according to the magnitude of the change in the geomagnetism value detected with the geomagnetism sensor 20.

It should be noted that, when there is a speaker and the like near the geomagnetism sensor 20, the geomagnetism sensor 20 may be magnetized due to a magnetic field leaking from the speaker. As a result, an error (an offset) may occur in the output of the geomagnetism sensor 20. To this end, when the output of the geomagnetism sensor 20 is utilized for measuring an orientation, it is necessary to perform a process of correcting the offset. However, in the first embodiment, it is determined whether the user is in the moving state on the train or in the automobile according to the magnitude of the change in the geomagnetism value detected with the geomagnetism sensor 20 without considering the orientation. Accordingly, during the determination, it is necessary to perform the process of correcting the offset. Further, it may be configured such that the automobile and train determination process is performed every specific period of time, or regularly.

Second Embodiment

Figure 5:
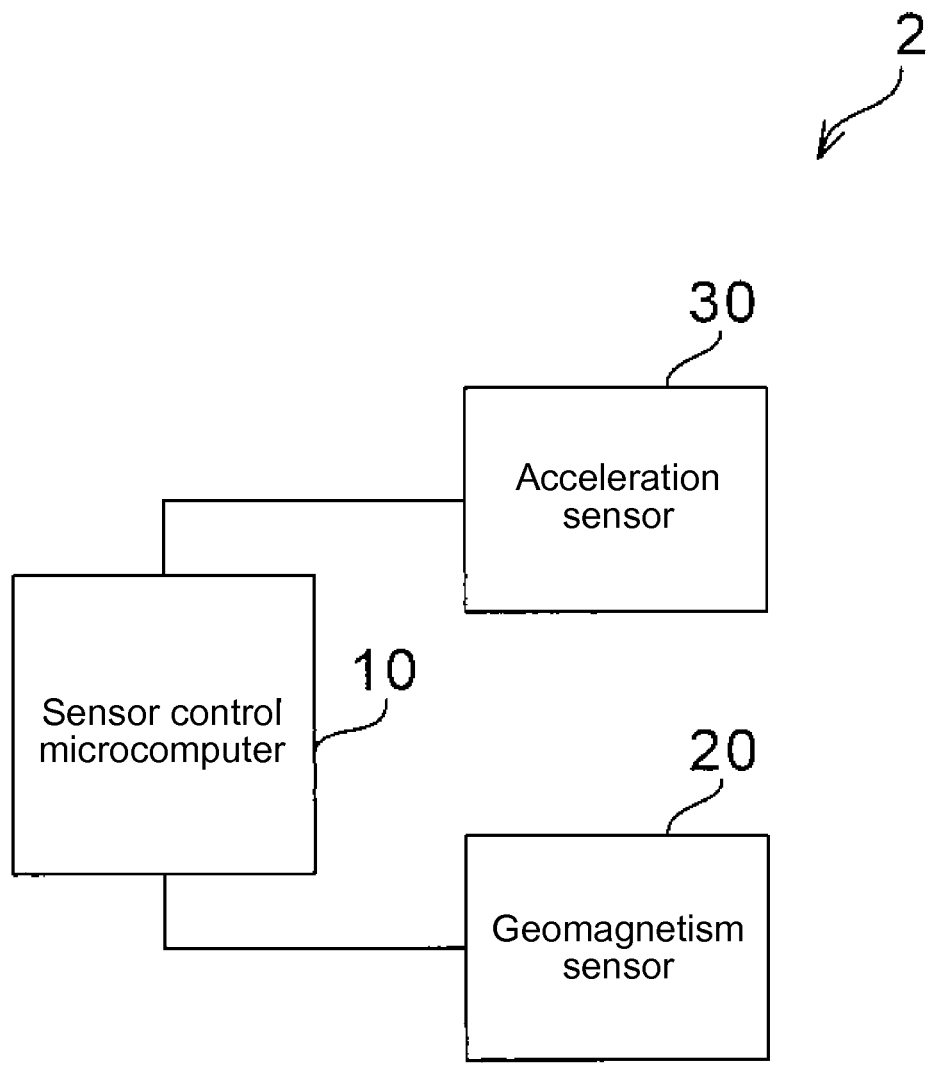
FIG. 5 is a block diagram showing a configuration of an electrical device according to a second embodiment of the present invention.

A second embodiment of the present invention will be explained next. FIG. 5 is a block diagram showing a configuration of an electrical device 2 according to the second embodiment of the present invention. As shown in FIG. 5, the electrical device 2 includes an acceleration sensor 30, in addition to the sensor control microcomputer 10 and the geomagnetism sensor 20 in the first embodiment. Similar to the geomagnetism sensor 20, the acceleration sensor 30 is connected to the IF 18 (refer to FIG. 1 as well) of the sensor control microcomputer 10.

In the second embodiment, the acceleration sensor 30 is configured to detect an acceleration value, so that the acceleration sensor 30 outputs a detection result to the sensor control microcomputer 10. The acceleration sensor 30 may be a sensor for detecting the acceleration value in one specific axis, or a sensor for detecting the acceleration value in each of a plurality of axes (two axes or three axes). When the acceleration sensor 30 is the sensor for detecting the acceleration value in one specific axis, the acceleration sensor 30 outputs acceleration data representing the acceleration value in the axis as the detection result. When the acceleration sensor 30 is the sensor for detecting the acceleration value in a plurality of axes, the acceleration sensor 30 outputs acceleration data representing the acceleration value in each of the axes as the detection result.

In the second embodiment, before performing the train and automobile determination process in the first embodiment, it is determined whether the user is in the moving state outside a vehicle (for example, the user is walking) or in the vehicle using the detection result of the acceleration sensor 30. When it is determined that the user is in the moving state in the vehicle, the train and automobile determination process in the first embodiment is performed. It should be noted that a series of steps in the second embodiment including the determination process according to the detection result of the acceleration sensor 30 is referred to a comprehensive determination process.

Figure 6:
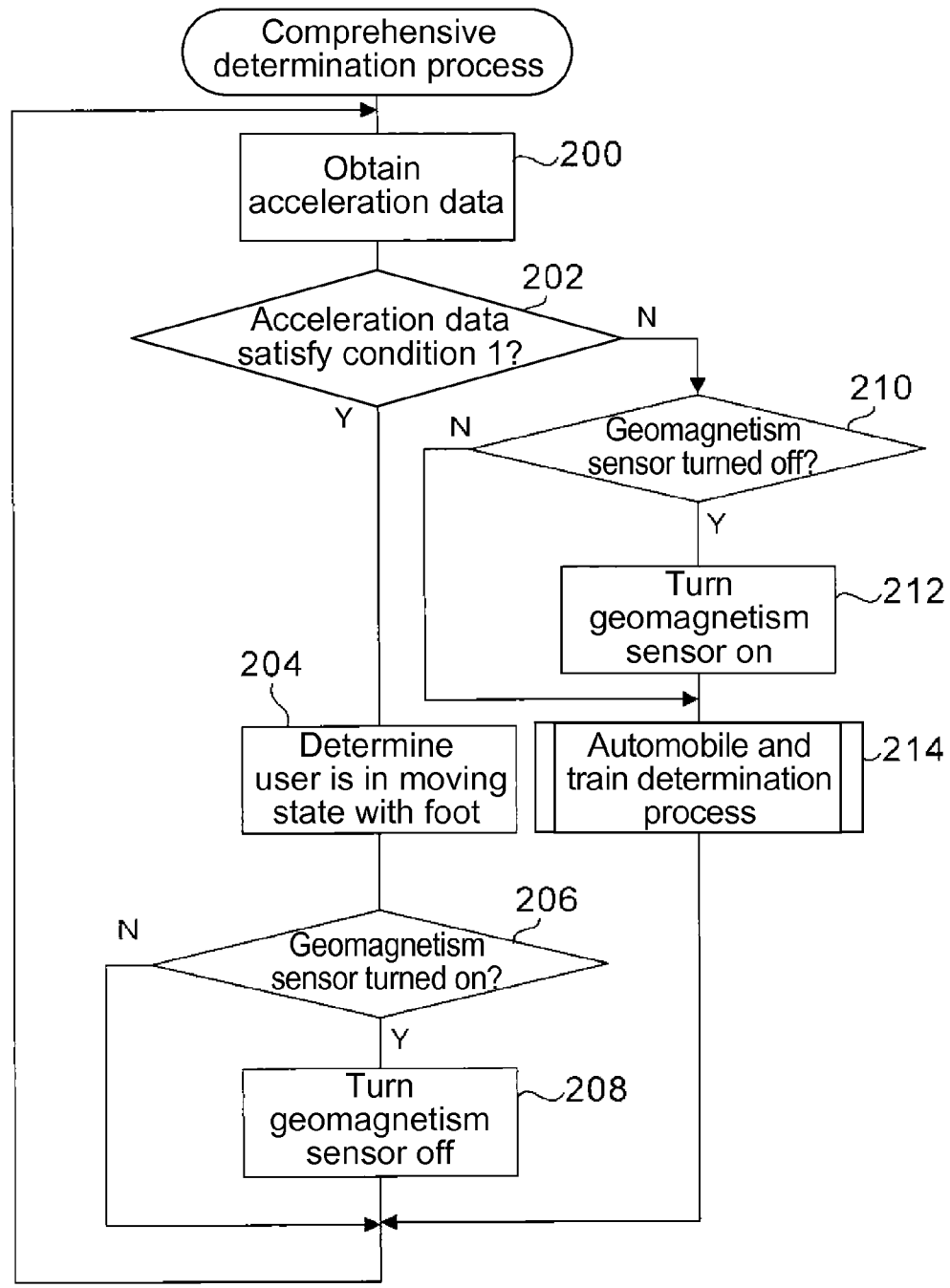
FIG. 6 is a flow chart No. 1 showing an operation of a determination device of the electrical device according to the second embodiment of the present invention.

The comprehensive determination process performed with the sensor control microcomputer 10 will be explained next in more detail with reference to FIG. 6. FIG. 6 is a flow chart showing an operation of the determination device 10 of the electrical device 2 according to the second embodiment of the present invention. More specifically, the CPU 12 of the sensor control microcomputer 10 executes the program to perform the comprehensive determination process represented with the flow chart shown in FIG. 6.

In step 200, the sensor control microcomputer 10 obtains the acceleration data from the acceleration sensor 30. In this case, similar to the geomagnetism data in the first embodiment, the sensor control microcomputer 10 obtains the acceleration data in a predetermined number (may be different from the number of geomagnetism data in the first embodiment). It should be noted that, when the sensor control microcomputer 10 starts the comprehensive determination process, the geomagnetism sensor 20 is turned off.

In step 202, the sensor control microcomputer 10 analyzes the acceleration data thus obtained, and determines whether the acceleration data satisfies a predetermined condition (referred to as a condition 1). The condition 1 is used to determine whether the user is in the moving state with foot. For example, the condition 1 may correspond to determination whether a magnitude of a change in the acceleration value in a specific period of time is smaller than a threshold value. Alternatively, the condition 1 may correspond to determination whether an amplitude or a cycle of the acceleration value is within a predetermined range (or outside a predetermined range) when the acceleration value is expressed in a wave shape.

In step 204, when the sensor control microcomputer 10 determines that the acceleration data thus obtained satisfies the condition 1 in step 202, the sensor control microcomputer 10 determines that the user is in the moving state with foot.

It should be noted that the method of determining the moving state of the user using the acceleration data is not limited to the method described above. For example, a well-known method disclosed in Patent Reference may be adopted.

In the second embodiment, it is configured to determine whether the user is in the moving state of walking or is in the moving state in the vehicle using the acceleration data. The present invention is not limited thereto, and it may be configured to determine whether the user is in the moving state of walking or running, or is in the moving state in the vehicle using the acceleration data. For example, a plurality of threshold values may be defined to determine the moving state of walking, the moving state of running, or the moving state in the vehicle.

In the second embodiment, when the acceleration sensor 30 detects the acceleration value in one axis, the moving state of the user is determined using the acceleration value in one axis. When the geomagnetism sensor 20 detects the acceleration values in a plurality of axes, the moving state of the user is determined using the composite value combined of the acceleration value in each of the axes. Alternatively, the moving state of the user is determined using the largest acceleration value among the acceleration values in a plurality of axes.

When the sensor control microcomputer 10 determines that the acceleration data thus obtained do not satisfy the condition 1 in step 202, the process proceeds to step 210. In step 210, the sensor control microcomputer 10 determines whether the geomagnetism sensor 20 is turned off. In step 212, when the sensor control microcomputer 10 determines that the geomagnetism sensor 20 is turned off in step 210, the sensor control microcomputer 10 turns the geomagnetism sensor 20 on, so that the detection operation of the geomagnetism sensor 20 is started. In step 214, the automobile and train determination process in the first embodiment is performed. When the sensor control microcomputer 10 determines that the geomagnetism sensor 20 is turned on in step 210, the process skips step 212, and the automobile and train determination process in the first embodiment is performed in step 214.

In step 206, after the sensor control microcomputer 10 determines that the user is in the moving state with foot in step 204, the sensor control microcomputer 10 determines whether the geomagnetism sensor 20 is turned on. In step 208, when the sensor control microcomputer 10 determines that the geomagnetism sensor 20 is turned on in step 206, the sensor control microcomputer 10 turns the geomagnetism sensor 20 off, and the process returns to step 200. When the sensor control microcomputer 10 determines that the geomagnetism sensor 20 is turned off in step 206, the process skips step 212 and returns to step 200.

Figure 7:
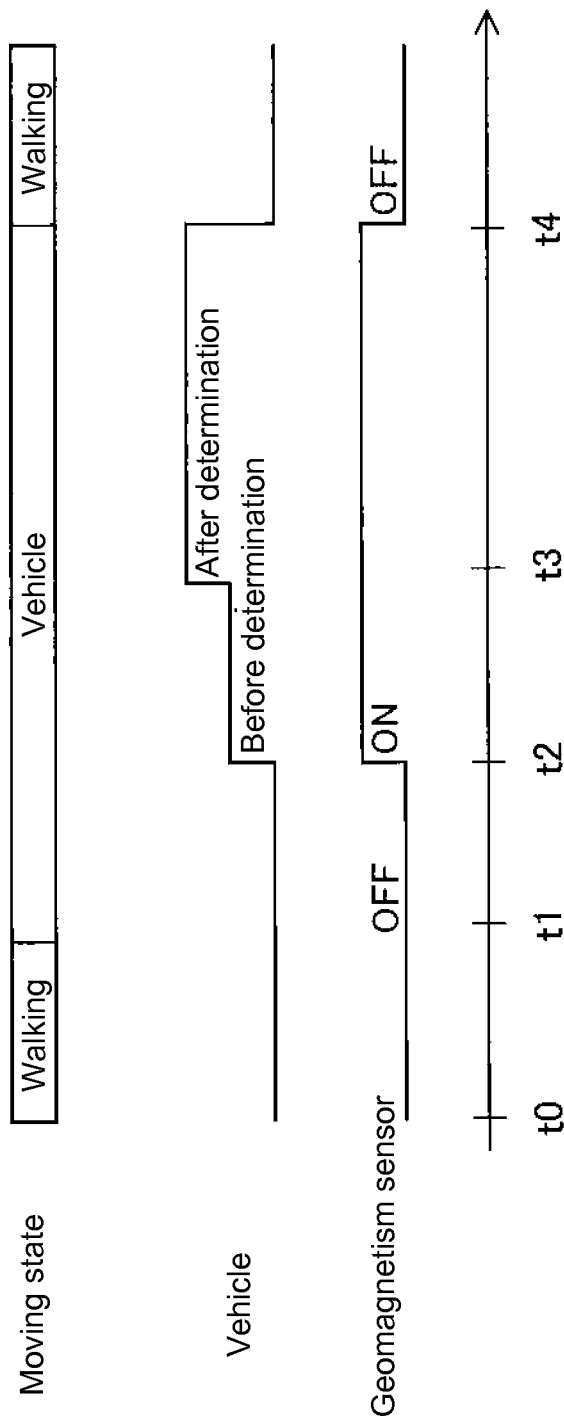
FIG. 7 is a time chart showing the operation of the determination device of the electrical device according to the second embodiment of the present invention.

The operation of the determination device 10 will be explained next with reference to a time chart shown in FIG. 7. FIG. 7 is the time chart showing the operation of the determination device 10 of the electrical device 2 according to the second embodiment of the present invention.

As shown in FIG. 7, the user is walking during a period of time from the time t0 to the time t1. Accordingly, during this period of time, according to the output of the acceleration sensor 30, it is determined that the user is in the moving state of walking, and the geomagnetism sensor 20 is turned off.

Afterward, the user gets on the vehicle at the time t1. According to the output of the acceleration sensor 30, the sensor control microcomputer 10 determines that the user is in the moving state in the vehicle at the time t2. Accordingly, the sensor control microcomputer 10 turns on the geomagnetism sensor 20, so that the sensor control microcomputer 10 starts the train and automobile determination process. At the time t3, as explained as the first embodiment, the sensor control microcomputer 10 determines whether the user is in the moving state on the train or in the automobile according to the geomagnetism data. When the moving state of the user is changed to the moving state of walking at the time t4, it is determined that the user is in the moving state of walking according to the output of the acceleration sensor 30, and the geomagnetism sensor 20 is changed from the on state to the off state.

As described above, in the second embodiment, when the acceleration sensor 30 is provided, it is possible to determine the moving state of the user other than on the train or in the automobile. Further, only when the user is in the moving state on the train or in the automobile, the geomagnetism sensor 20 is turned on, thereby conserving power consumption.

Figure 8:
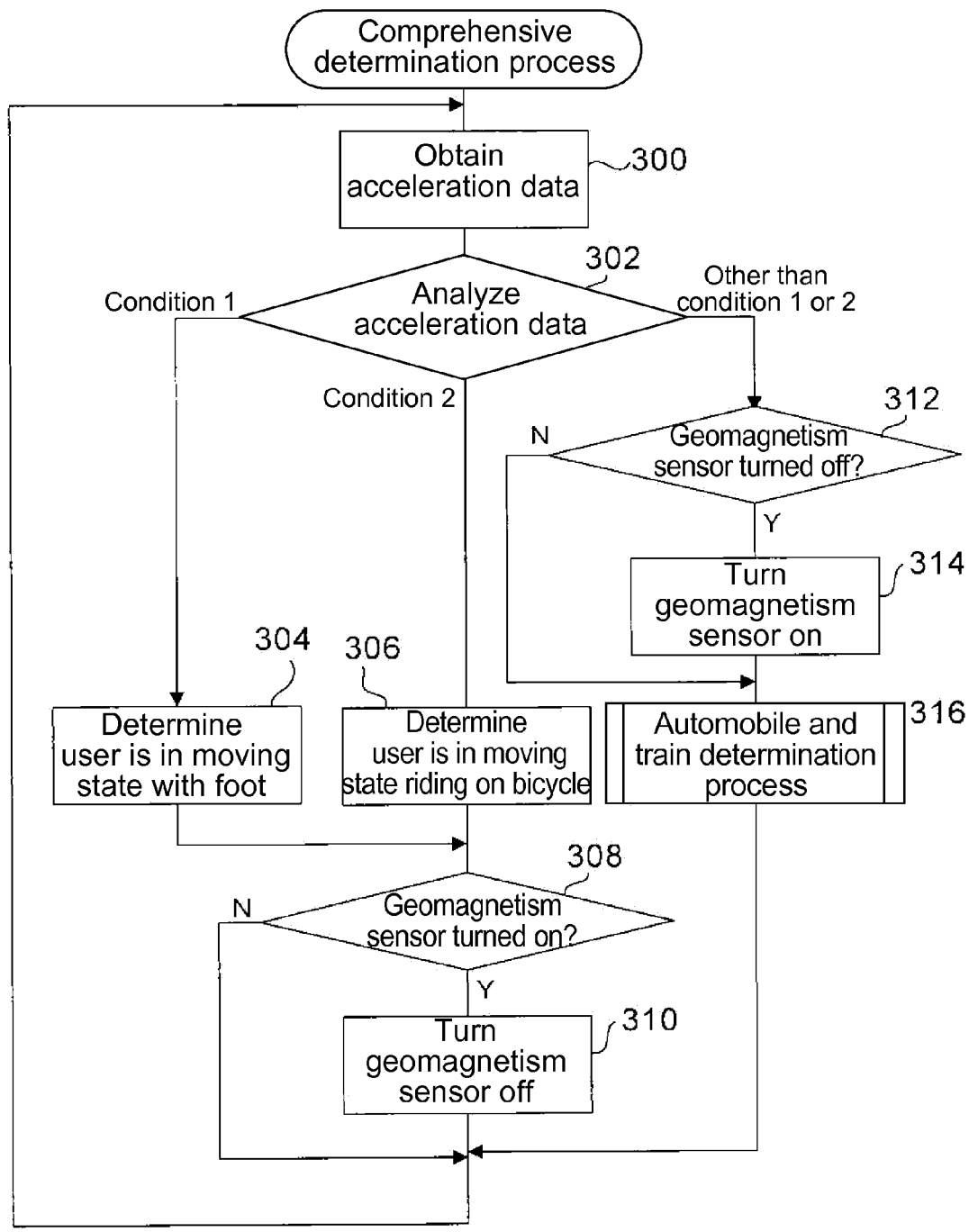
FIG. 8 is a flow chart No. 2 showing the operation of the determination device of the electrical device according to the second embodiment of the present invention.

In the second embodiment, as a modified example, it may be configured such that it is possible to detect the moving state of the user riding on a bicycle other than on the train or in the automobile using the output of the acceleration sensor 30. FIG. 8 is a flow chart No. 2 showing the modified example of the operation of the determination device 10 of the electrical device 2 according to the second embodiment of the present invention.

In step 300, similar to the process in step 200, the sensor control microcomputer 10 obtains the acceleration data from the acceleration sensor 30. It should be noted that, when the sensor control microcomputer 10 starts the comprehensive determination process, the geomagnetism sensor 20 is turned off.

In step 302, the sensor control microcomputer 10 analyzes the acceleration data thus obtained, and determines whether the acceleration data satisfies the condition 1 or a condition 2. The condition 1 is used to determine whether the user is in the moving state with foot. The condition 2 is used to determine whether the user is in the moving state of riding on the bicycle.

In step 304, when the sensor control microcomputer 10 determines that the acceleration data thus obtained satisfy the condition 1 in step 302, the sensor control microcomputer 10 determines that the user is in the moving state of walking.

In step 306, when the sensor control microcomputer 10 determines that the acceleration data thus obtained satisfy the condition 2 in step 302, the sensor control microcomputer 10 determines that the user is in the moving state of riding on the bicycle.

When the sensor control microcomputer 10 determines that the acceleration data thus obtained do not satisfy the condition 1 or the condition 2 in step 302, the process proceeds to step 312. In step 312, the sensor control microcomputer 10 determines whether the geomagnetism sensor 20 is turned off. In step 314, when the sensor control microcomputer 10 determines that the geomagnetism sensor 20 is turned off in step 312, the sensor control microcomputer 10 turns the geomagnetism sensor 20 on, so that the detection operation of the geomagnetism sensor 20 is started. In step 316, the automobile and train determination process in the first embodiment is performed. When the sensor control microcomputer 10 determines that the geomagnetism sensor 20 is turned on in step 312, the process skips step 314, and the automobile and train determination process in the first embodiment is performed in step 316.

In step 308, after the sensor control microcomputer 10 determines that the user is in the moving state with foot in step 304, and the sensor control microcomputer 10 determines that the user is in the moving state of riding on the bicycle in step 304, the sensor control microcomputer 10 determines whether the geomagnetism sensor 20 is turned on. In step 310, when the sensor control microcomputer 10 determines that the geomagnetism sensor 20 is turned on in step 308, the sensor control microcomputer 10 turns the geomagnetism sensor 20 off, and the process returns to step 300. When the sensor control microcomputer 10 determines that the geomagnetism sensor 20 is turned off in step 308, the process skips step 310 and returns to step 300.

Third Embodiment

Figure 9:
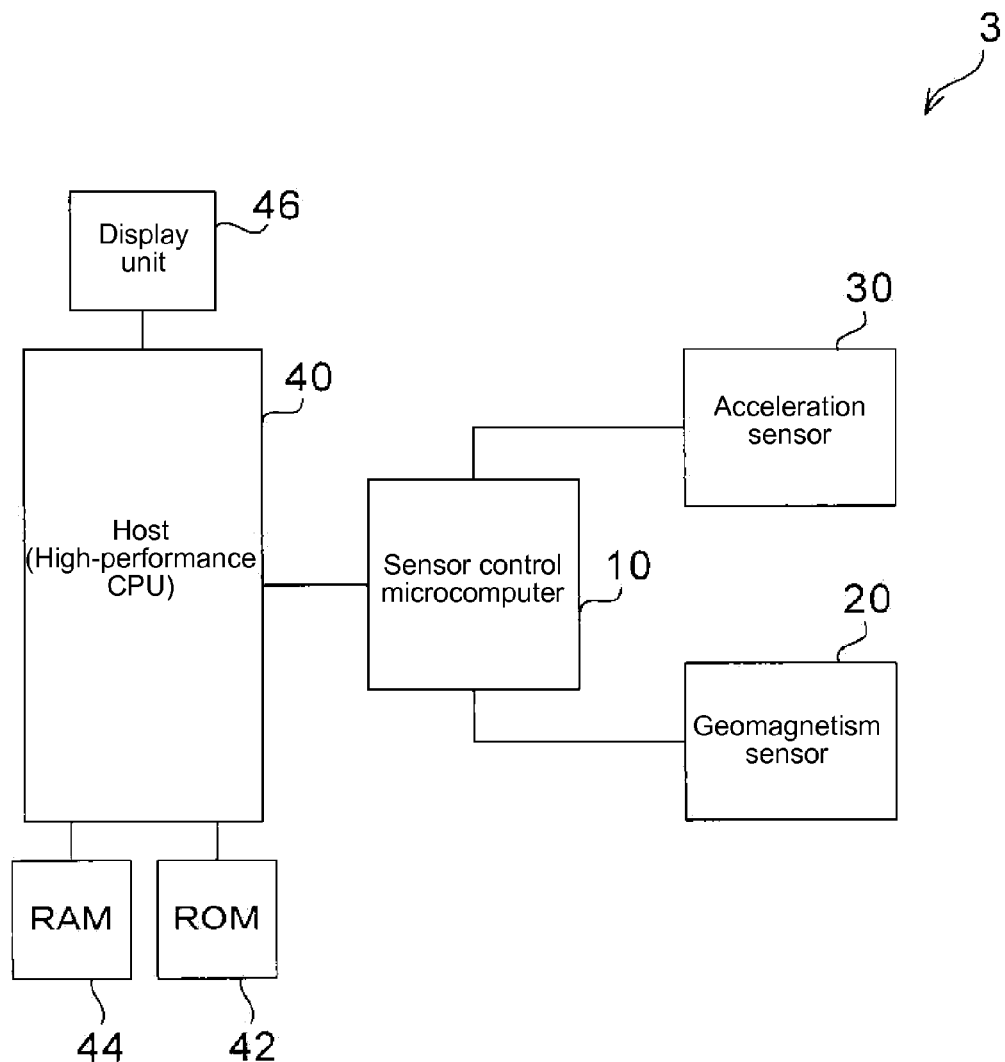
FIG. 9 is a block diagram showing a configuration of an electrical device according to a third embodiment of the present invention.

A third embodiment of the present invention will be explained next. FIG. 9 is a block diagram showing a configuration of an electrical device 3 according to the third embodiment of the present invention. As shown in FIG. 5, the electrical device 3 includes a high-performance CPU (referred to as a host) 40; an ROM (Read Only Memory) 42; an RAM (Random Access Memory) 44; and a display unit 46, in addition to the sensor control microcomputer 10, the geomagnetism sensor 20, and the acceleration sensor 30 in the second embodiment. For example, the acceleration sensor 30 may include a mobile device such as a smartphone.

In the third embodiment, the host 40 is formed of a CPU having a higher performance capability and larger power consumption than those of the CPU constituting the sensor control microcomputer 10. The host 40 is connected to the sensor control microcomputer 10, the ROM 42, the RAM 44, and the display unit 46. Further, the sensor control microcomputer 10 is provided with an interface for connecting to the host 40, so that the sensor control microcomputer 10 is connected to the host 40 through the interface.

In the third embodiment, the host 40 executes a program stored in the ROM 42 to realize various functions. The RAM 44 is used as a work memory and the like. The display unit 46 may be formed of a liquid crystal display. Further, in addition to the display unit 46, an operation unit may be connected to the host 40, so that the user can input an instruction or perform various operations. Further, the display unit 46 may be formed of a touch panel and the like, so that the display unit 46 has the display function and the operation function.

In the third embodiment, not the host 40, but the sensor control microcomputer 10 is configured to determine the moving state of the user. Accordingly, if necessary, the host 40 is capable of obtaining the determination result from the sensor control microcomputer 10 to be displayed on the display unit 46, or to be used for another process.

As described above, in the third embodiment, the host 40 is formed of the CPU having the higher performance capability and the larger power consumption than those of the CPU constituting the sensor control microcomputer 10. Further, not the host 40, but the sensor control microcomputer 10 having the lower performance capability and the lower power consumption is configured to determine the moving state of the user. Accordingly, it is not necessary to run the host 40 all the time, thereby making it possible to switch to the power save mode. Then, when it is necessary, the host 40 is returned from the power save mode, so that the host 40 obtains the determination result from the sensor control microcomputer 10 to be displayed on the display unit 46. As a result, it is possible to reduce the power consumption.

It should be noted that, when the host 40 executes a program of an orientation geomagnetism indicator for measuring and displaying an orientation, the host 40 may be configured to obtain and use the geomagnetism data from the geomagnetism sensor 20 through the sensor control microcomputer 10. More specifically, the geomagnetism sensor 20 detects the geomagnetism data similar to the train and automobile determination process in the first and second embodiments, so that the geomagnetism data may be used in the orientation geomagnetism indicator program executed with the host 40. In this case, the sensor control microcomputer 10 temporarily stores the geomagnetism data in a specific number or during a specific period of time including the latest geomagnetism data obtained from the geomagnetism sensor 20 in the RAM 16. Then, according to the request from the host 40, the sensor control microcomputer 10 retrieves the geomagnetism data, so that the sensor control microcomputer 10 outputs the geomagnetism data to the host 40.

Alternatively, the sensor control microcomputer 10 may be configured to store the geomagnetism data when a specific event happens as a trigger. More specifically, for example, when the sensor control microcomputer 10 receives a startup notification of the orientation geomagnetism indicator application from the host 40, or receives a storage instruction from the host 40, the sensor control microcomputer 10 starts the process of temporarily storing the geomagnetism data in the RAM 16, so that the sensor control microcomputer 10 temporarily stores the geomagnetism data in a specific number or during a specific period of time.

Figure 10:
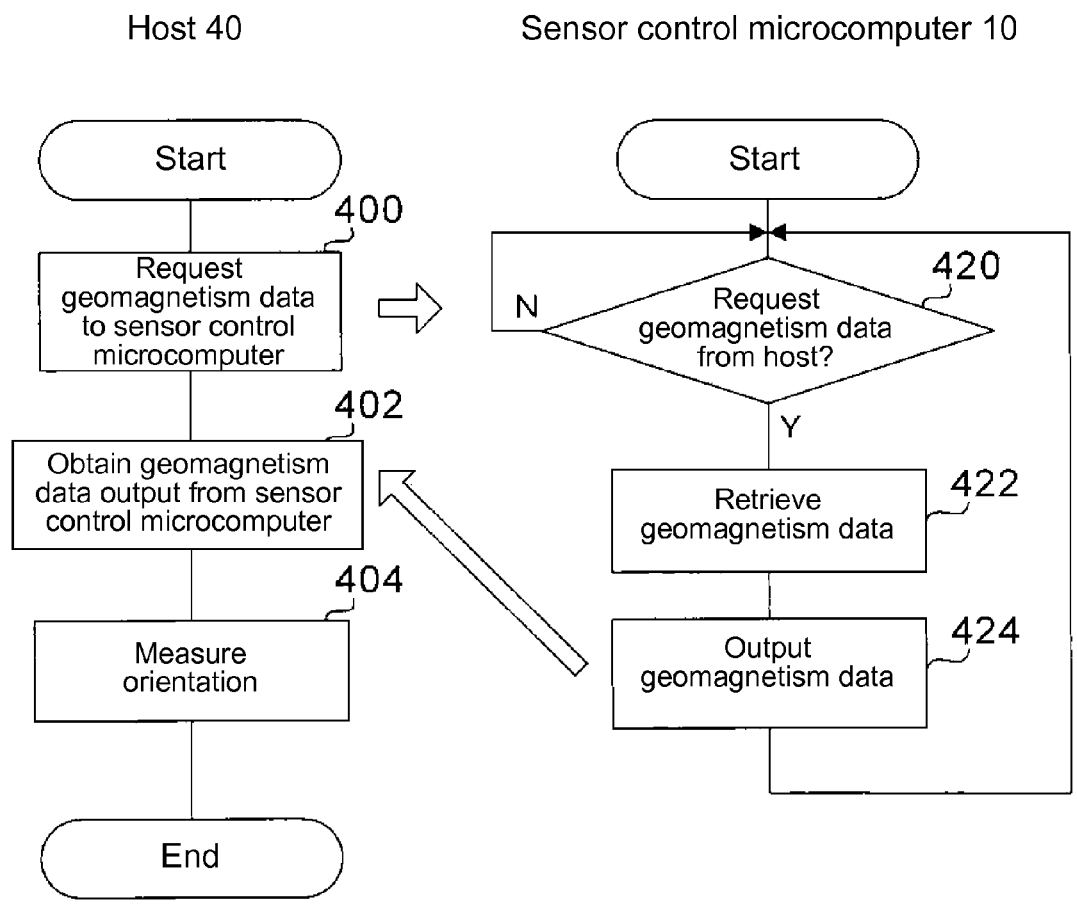
FIG. 10 is a flow chart No. 1 showing an operation of a determination device of the electrical device according to the third embodiment of the present invention.

An operation of the host 40 and the sensor control microcomputer 10 will be explained next with reference to FIG. 10 when the host 40 shares the geomagnetism data used with the sensor control microcomputer 10. FIG. 10 is a flow chart No. 1 showing the operation of the determination device 10 of the electrical device 3 according to the third embodiment of the present invention.

In step 400, the host 40 requests the geomagnetism data to the sensor control microcomputer 10. In step 420, the sensor control microcomputer 10 determines whether the host 40 requests the geomagnetism data. In step 422, when the sensor control microcomputer 10 determines that the host 40 requests the geomagnetism data in step 420, the sensor control microcomputer 10 retrieves the geomagnetism data from the RAM 16 in the case that the geomagnetism data used (or will be used) on the train and automobile determination process are stored in the RAM 16. In step 424, the sensor control microcomputer 10 outputs the geomagnetism data thus retrieved to the host 40.

In step 402, the host 40 obtains the geomagnetism data output from the sensor control microcomputer 10. In step 404, the host 40 measures the orientation through executing the orientation geomagnetism indicator application according to the geomagnetism value of the geomagnetism data obtained from the sensor control microcomputer 10.

As described above, when the sensor control microcomputer 10 and the host 40 share the geomagnetism data, it is possible to improve the efficiency, as opposed to the case than the sensor control microcomputer 10 and the host 40 separately obtain the geomagnetism data from the geomagnetism sensor 20.

As described above, in the first embodiment, the host 40 performs the offset correction process normally. Alternatively, it may be configured such that the host 40 outputs the correction data of the offset correction process to the sensor control microcomputer 10. Then, the sensor control microcomputer 10 corrects the geomagnetism data according to the correction data, and outputs the geomagnetism data thus corrected to the host 40.

It should be noted that, when the user is in the moving state on the train, the geomagnetism value tends to be disturbed excessively. Accordingly, when the geomagnetism value disturbed excessively is used for measuring the orientation, it may be difficult to accurately measure the orientation. To this end, it may be configured such that when it is determined that the user is in the moving state on the train, the host 40 stops executing the orientation geomagnetism indicator application, or notifies an alarm to the user.

Figure 11:
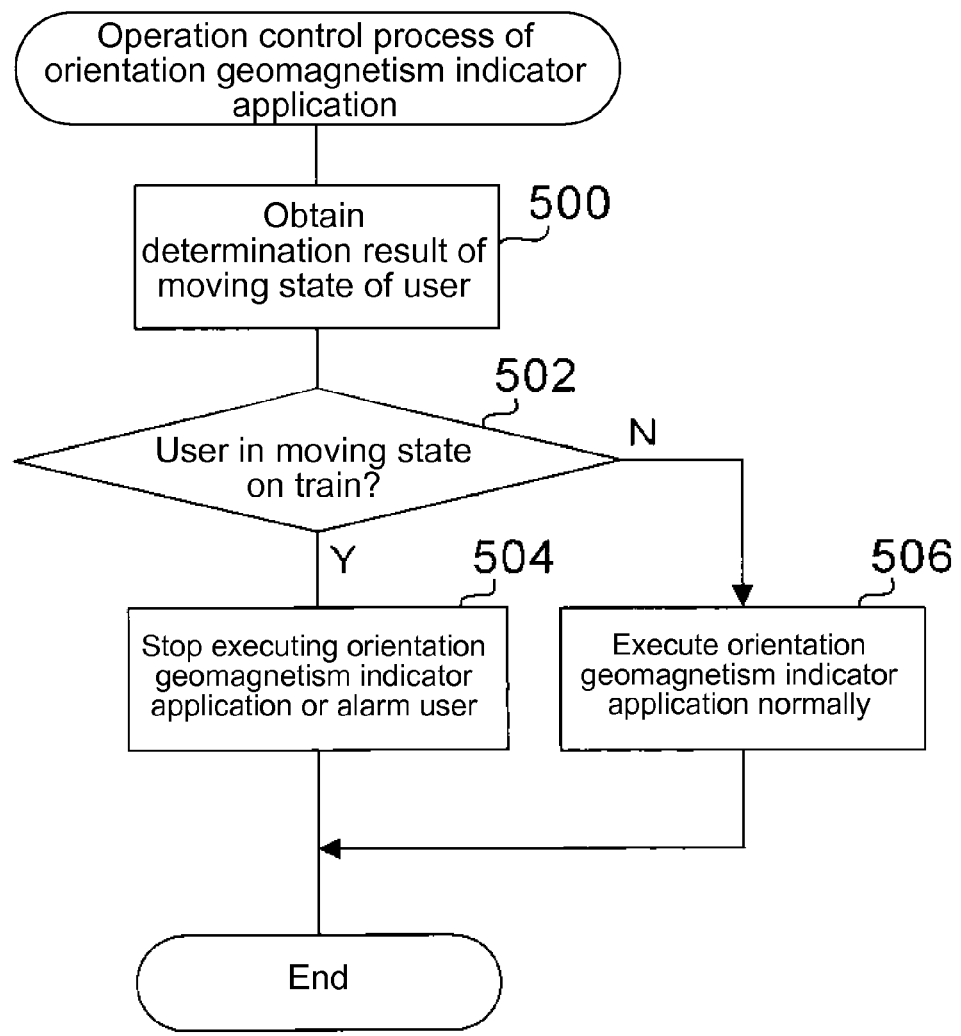
FIG. 11 is a flow chart No. 2 showing the operation of the determination device of the electrical device according to the third embodiment of the present invention.

FIG. 11 is a flow chart No. 2 showing the operation of the determination device 10 of the electrical device 3 in an operation control process of the orientation geomagnetism indicator application executed with the host 40 according to the third embodiment of the present invention.

In step 500, the host 40 requests the sensor control microcomputer 10, so that the host 40 obtains the determination result of the moving state of the user determined with the sensor control microcomputer 10.

In step 502, the host 40 determines whether the determination result thus obtained indicates that the user is in the moving state on the train. In step 504, when the host 40 determines that the user is in the moving state on the train in step 502, the host 40 stops (prohibits) executing the orientation geomagnetism indicator application, or notifies the user with the alarm indicating that the orientation to be displayed may be erroneous. It should be noted that the host 40 may do both stopping executing the orientation geomagnetism indicator application, and notifying the user with the alarm. In this case, the orientation geomagnetism indicator application is stopped, so that the alarm may indicate that the orientation geomagnetism indicator application is not currently available.

In step 506, when the host 40 determines that the user is not in the moving state on the train in step 502, the host 40 executes the orientation geomagnetism indicator application normally, so that the orientation is displayed on the display unit 46.

As described above, in the third embodiment, the determination result of the sensor control microcomputer 10 can be used for controlling the execution of the orientation geomagnetism indicator application.

The disclosure of Japanese Patent Application No. 2012-213090, filed on Sep. 26, 2012, is incorporated in the application by reference.

While the invention has been explained with reference to the specific embodiments of the invention, the explanation is illustrative and the invention is limited only by the appended claims.

What is claimed is:

1. A determination device, comprising:
    a geomagnetism value obtaining unit for obtaining a geomagnetism value detected with a geomagnetism sensor; and
    a geomagnetism value determining unit for determining whether a user having the geomagnetism sensor is in a moving state in an automobile or on a train according to a magnitude of a change in the geomagnetism value obtained with the geomagnetism value obtaining unit.

2. The determination device according to claim 1, wherein said geomagnetism value determining unit is configured to determine whether the user is in the moving state in the automobile or on the train according to the magnitude of the change in the geomagnetism value including at least one of a dispersion of the geomagnetism value, a difference between a minimum value and a maximum value of the geomagnetism value, the maximum value of the geomagnetism value, and the minimum value of the geomagnetism value.

3. The determination device according to claim 1, further comprising:
- an acceleration value obtaining unit for obtaining an acceleration value detected with an acceleration sensor; and
- an acceleration value determining unit for determining whether the user having the acceleration sensor is in a moving state of walking or running or on a bicycle, or the moving state in the automobile or on the train according to the acceleration value obtained with the acceleration value obtaining unit,
- wherein said geomagnetism value determining unit is configured to determine whether the user is in the moving state in the automobile or on the train according to the magnitude of the change in the geomagnetism value when the acceleration value determining unit determines that the user is the moving state in the automobile or on the train.

4. The determination device according to claim 3, further comprising a control unit for turning on the geomagnetism sensor when the acceleration value determining unit determines that the user is the moving state in the automobile or on the train, and for turning off the geomagnetism sensor when the acceleration value determining unit determines that the user is the moving state of walking or running or on the bicycle.

5. An electrical device comprising the geomagnetism sensor for detecting the geomagnetism value and the determination device according to claim 1.

6. An electrical device comprising the geomagnetism sensor for detecting the geomagnetism value, the acceleration sensor for detecting the acceleration value, and the determination device according to claim 3.

7. An electrical device comprising:
- the geomagnetism sensor for detecting the geomagnetism value;
- the determination device according to claim 1;
- a display unit;
- an orientation measurement unit for measuring an orientation using the geomagnetism value detected with the geomagnetism sensor so that the orientation is displayed on the display unit; and
- a processing unit for performing a process of stopping the orientation measurement unit to measure the orientation, or a process of notifying that the orientation displayed on the display unit may be erroneous when the geomagnetism value determining unit determines that the user is the moving state on the train.

8. A method of determining a moving state of a user, comprising the steps of:
- obtaining a geomagnetism value detected with a geomagnetism sensor; and
- determining whether the user having the geomagnetism sensor is in the moving state in an automobile or on a train according to a magnitude of a change in the geomagnetism value thus obtained.

9. A non-transitory computer readable medium that stores a program that causes a computer to execute the steps of:
- obtaining a geomagnetism value detected with a geomagnetism sensor; and
- determining whether the user having the geomagnetism sensor is in the moving state in an automobile or in a train according to a magnitude of a change in the geomagnetism value thus obtained.

* * * * *